United States Patent

Staley et al.

[15] 3,645,608
[45] Feb. 29, 1972

[54] COOLING MEANS FOR REFLECTING DEVICE

[72] Inventors: Charles F. Staley, Lake Park; Fredrick J. Staudt, Riviera Beach, both of Fla.

[73] Assignee: United Aircraft Corporation, East Hartford, Conn.

[22] Filed: May 5, 1970

[21] Appl. No.: 34,672

Related U.S. Application Data

[63] Continuation of Ser. No. 804,386, Mar. 3, 1969.

[52] U.S. Cl. ........................................................... 350/310
[51] Int. Cl. ....................................................... G02b 5/08
[58] Field of Search ................ 350/61, 63, 93, 179, 288, 312, 350/253, 310; 356/132; 353/52, 54; 126/270, 271

[56] References Cited

UNITED STATES PATENTS

| | | | |
|---|---|---|---|
| 1,530,441 | 3/1925 | Thomson | 350/310 |
| 3,386,197 | 6/1968 | Eltstrom | 350/312 |
| 2,705,948 | 4/1955 | Rostock | 126/271 |
| 3,488,110 | 1/1970 | Evoy | 350/310 |

FOREIGN PATENTS OR APPLICATIONS

| | | | |
|---|---|---|---|
| 1,097,233 | 12/1953 | France | 126/271 |
| 568,612 | 11/1957 | Italy | 126/271 |

*Primary Examiner*—David Schonberg
*Assistant Examiner*—Michael J. Tokar
*Attorney*—Jack N. McCarthy

[57] ABSTRACT

This reflecting device is for use with beams having the ability to heat said reflecting device while being reflected thereby and includes a thick backing plate with a channel plate fixed to the surface thereof with the channels facing the backing plate. A reflecting surface is formed on the flat side of the channel plate and a manifold system directs a coolant through the passages formed by the channels of the channel plate and the flat mating surface of the backing plate. The manifold system includes an inlet and an outlet which can be connected to any desired control means to achieve the proper flow. This cooling arrangement not only provides the cooling necessary to maintain the reflecting device in an operating condition but also maintains the high quality of the reflecting surface. The invention herein described was made in the course of or under a contract with the Department of the Air Force.

7 Claims, 3 Drawing Figures

Patented Feb. 29, 1972

3,645,608

INVENTORS
CHARLES F. STALEY
FREDRICK J. STAYDT
BY Jack N. McCarthy
AGENT

COOLING MEANS FOR REFLECTING DEVICE

CROSS-REFERENCES TO RELATED APPLICATIONS

This application is a continuation of application Ser. No. 804,386, filed Mar. 3, 1969, for "Cooling Means for Reflecting Device." This application is an improvement on the device disclosed in application Ser. No. 43,493, filed June 4, 1970, for "Cooling Means for Reflecting Device."

The invention herein described was made in the course of or under a contract with the Department of the Air Force.

BACKGROUND OF THE INVENTION

Reflecting surfaces have been made by having passages drilled radially into a block adjacent the reflecting surface; however, this method was not satisfactory due to difficulty in manifolding the passages and having the passages follow a curved surface. The passages also would have to be large and the material thickness from the surface to the cooling channel would be excessive.

SUMMARY OF THE INVENTION

This reflecting device permits close dimensional tolerance passages and simplified manifolding. The coolant passages can also be formed of complex contours with the same tolerance. This construction also gives flexibility of materials in that the requirement for thermal stability of the material can be relaxed in favor of other requirements if necessary. The method of making a reflecting device such as this is greatly simplified and the quality greatly increased. Quality means that the reflecting surface is maintained to produce diffraction limited optics.

DESCRIPTION OF THE PREFERRED EMBODIMENT

Figure 1:
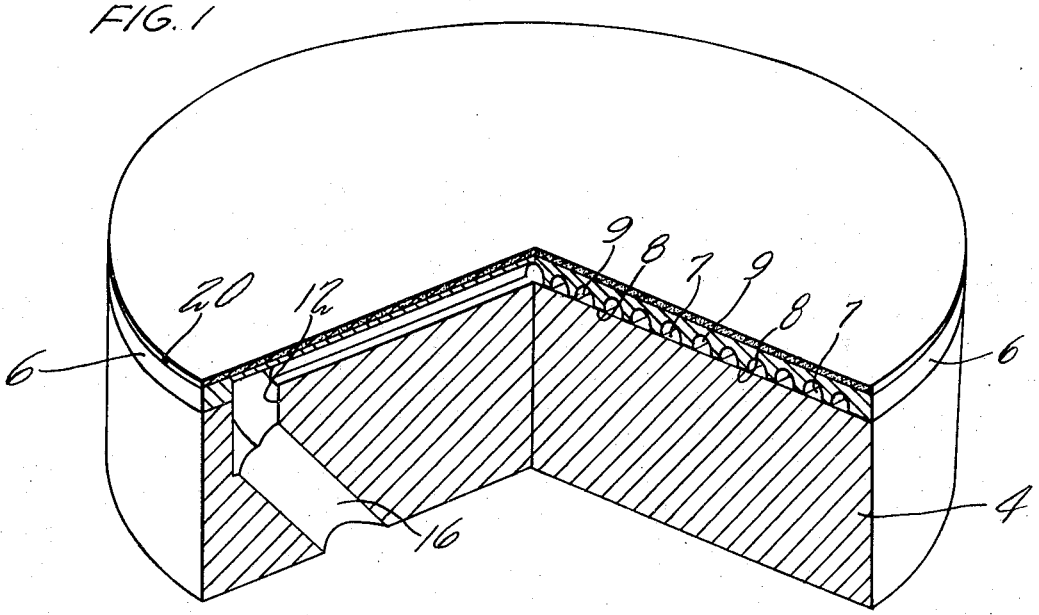
FIG. 1 is a schematic view in perspective showing the location of the inlet and showing the cooling passages.
Figure 2:
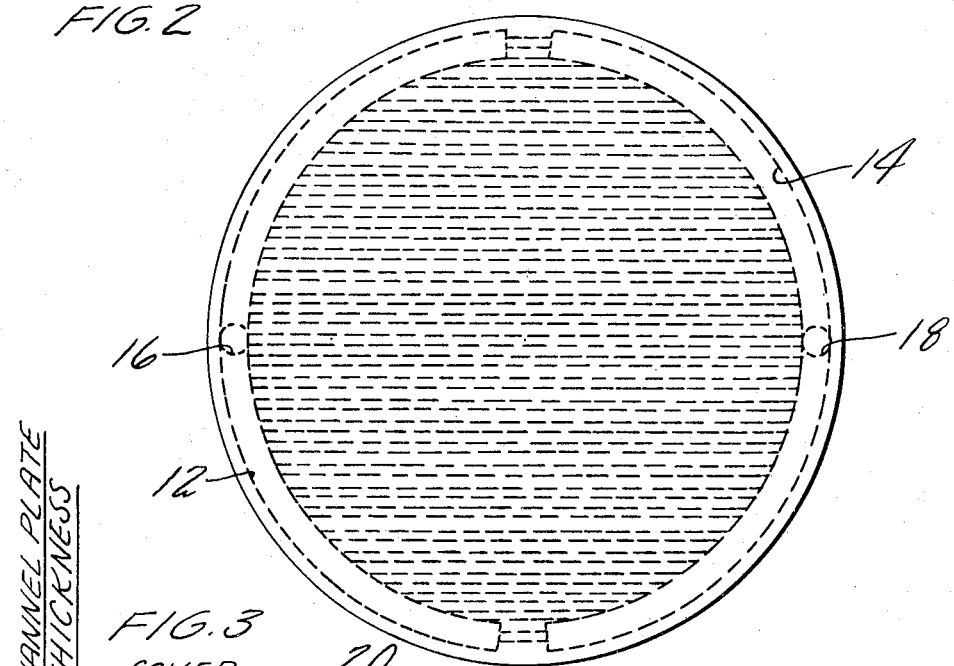
FIG. 2 is a top view of the device.
Figure 3:
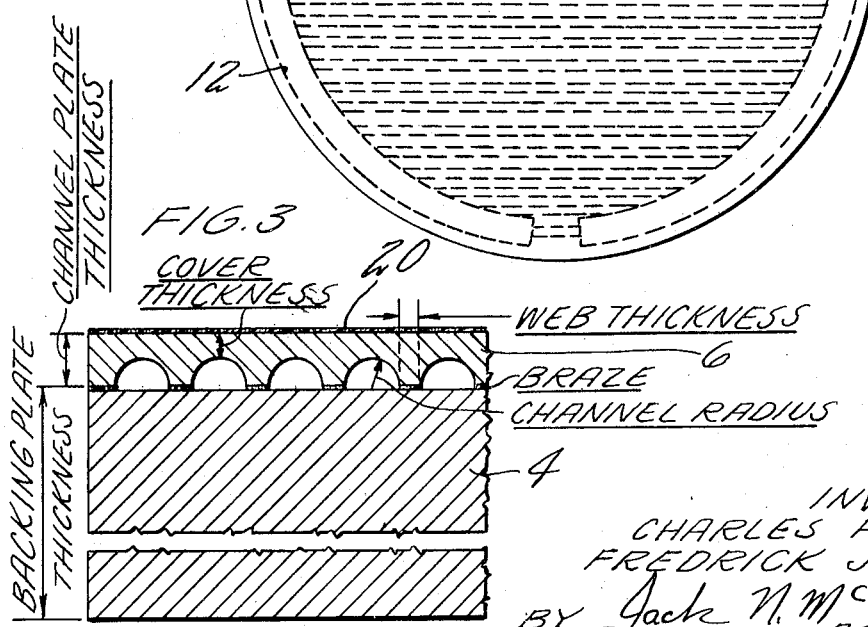
FIG. 3 is an enlarged schematic sectional view taken through the device showing the cooling passages.

In the reflecting device shown in FIG. 1, a backing plate 4 is shaped to receive the parallel webs of a channel plate 6. The channels 7 between the webs are semicircular in cross section to minimize pressure stresses. The webs 8 between the channels 7 are brazed at their faces to the face of the backing plate. The channels 7 then form passages 9 with the backing plate 4.

A manifold 12 connects all of the ends of the passages 9 on one side of the device and the manifold 14 connects all of the other ends of the passages 9 on the other side of the device. An inlet passageway 16 directs a coolant to the manifold 12 and an outlet passageway 18 directs the coolant away from the manifold 14. Any control means can be used to control the flow of coolant liquid through the inlet passageway 16, manifold 12, passages 9, manifold 14 and outlet passageway 18.

In forming this reflector, or mirror, the face of the rigid backing member is formed having a surface of predetermined shape. A flat plate of approximately the size of the desired reflector surface is formed to cooperate with the shaped surface of the rigid backing. The side of the flat plate to be fixed to the backing member has a plurality of grooves or channels therein extending from adjacent one edge to adjacent the other. A manifold connects the one end of the channels and another manifold connects the other ends. The cross section of said grooves, or channels, are dome shaped. The grooved side of the plate is brazed to the contoured surface of said rigid member forming the passages 9. A reflecting surface 20 is formed on the other side of the plate. This can be vapor deposited gold-chromium. As stated before, coolant is then flowed through the passages formed by the plate and rigid member.

In a mirror constructed in this manner the backing plate thickness was 2.000 inches, the channel plate thickness was 0.050 inch, the web thickness was 0.020 inch, the cover thickness was 0.020 inch and the channel radius was 0.030 inch. The coolant was water and the flow rate was approximately 5 lb./sec. The coolant flow is maintained at a rate which will prevent the temperature difference between the inlet passageway 16 and outlet passageway 18 from contributing to the thermal distortions.

We claim:

1. An optical reflecting device for operating under heat loads comprising a thick backing plate having a face of a predetermined shape, a second plate fixed to the surface thereof, said second plate having channels on the side facing the backing plate, said channels forming webs therebetween, the free faces of the webs being fixed to the backing plate, said channels forming passages with the backing plate, a manifold system adapted to contain a coolant formed between the backing plate and the second plate, said manifold system being connected to said passages, said free face of said second plate being treated to form a reflecting surface, the contour of the channels in said second plate being semicircular in cross section.

2. A reflecting device as set forth in claim 1 wherein said backing plate is approximately 40 times as thick as the second plate.

3. A reflecting device as set forth in claim 1 wherein the radius of the channels is one and one-half times the width of the webs.

4. A reflecting device as set forth in claim 1 wherein the cover thickness and web thickness are approximately equal, where the cover thickness is the distance in the second plate from the bottom of the channel to the other side.

5. A reflecting device as set forth in claim 1 wherein the backing plate thickness is 2.00 inches, the second plate thickness is 0.050 inch, the web thickness is 0.020 inch, and the channel radius is 0.030 inch.

6. A reflecting device as set forth in claim 1 wherein means direct the coolant into the manifold system for flow through said passages at a flow rate of approximately 5 lb./sec.

7. A reflecting device as set forth in claim 1 wherein the free faces of the webs are brazed to the backing plate.

* * * * *